(12) United States Patent
Graf

(10) Patent No.: US 6,800,691 B2
(45) Date of Patent: Oct. 5, 2004

(54) BLEND OF EPDM AND SBR USING AN EPDM OF DIFFERENT ORIGIN AS A COMPATIBILIZER

(75) Inventor: Hans-Joachim Graf, Stratford (CA)

(73) Assignee: Cooper Technology Services, LLC, Findlay, OH (US)

( * ) Notice: Subject to any disclaimer, the term of this patent is extended or adjusted under 35 U.S.C. 154(b) by 6 days.

(21) Appl. No.: 09/981,419

(22) Filed: Sep. 26, 2001

(65) Prior Publication Data

US 2003/0134983 A1 Jul. 17, 2003

(51) Int. Cl.$^7$ .............................. C08F 8/00; C08L 9/00; C08L 23/00; C08L 23/04; C08L 25/02
(52) U.S. Cl. ...................... 525/191; 525/216; 525/232; 525/240; 525/241; 524/425; 524/515; 524/525; 524/526; 524/497; 524/763; 524/847
(58) Field of Search ................................. 525/191, 216, 525/232, 240, 241; 524/425, 515, 525, 526, 497, 763, 847

(56) References Cited

U.S. PATENT DOCUMENTS

| | | | |
|---|---|---|---|
| 4,008,190 A | | 2/1977 | Taylor et al. |
| 4,405,756 A | | 9/1983 | Oyama et al. |
| 4,687,810 A | | 8/1987 | Coran |
| 4,981,900 A | | 1/1991 | Sugawara |
| 5,162,441 A | * | 11/1992 | Nakata et al. ............... 525/194 |
| 5,677,382 A | * | 10/1997 | Tsuji et al. .................. 525/237 |
| 5,686,529 A | * | 11/1997 | Srinivasan .................... 525/74 |

* cited by examiner

*Primary Examiner*—Nathan M. Nutter
(74) *Attorney, Agent, or Firm*—Fay, Sharpe, Fagan, Minnich & McKee, LLP

(57) ABSTRACT

A polymer blend of an ethylene-α-olefin-diene rubber and a conjugated diene rubber suitable for use as a replacement for unblended EPDM rubber in automotive applications. The rubber blends of the present invention comprise a high molecular weight EPDM rubber, a conjugated diene rubber, and a low molecular weight, high ethylene content EPDM rubber that functions as a compatibilizer. The resultant blend exhibits physical properties, including tensile and tear strength, that are comparable to conventional EPDM rubbers, while maintaining the excellent heat and weather resistance possessed by EPDM rubbers.

16 Claims, 1 Drawing Sheet

BLEND OF EPDM AND SBR USING AN EPDM OF DIFFERENT ORIGIN AS A COMPATIBILIZER

BACKGROUND OF THE INVENTION

1. Field of the Invention

The present invention relates to blends of an ethylene-propylene-diene (EPDM) rubber and a high diene hydrocarbon rubber for use as a replacement for unblended EPDM rubber parts. More particularly, the present invention pertains to blends of EPDM rubber and SBR rubber exhibiting tensile and tear strength comparable to the calculated values for an ideal blend of EPDM and SBR rubber while maintaining the excellent weather, ozone and thermal resistance exhibited by EPDM rubbers.

2. Discussion of the Art

Ethylene-$\alpha$-olefin-diene rubbers, particularly ethylene-propylene-diene (EPDM) rubbers, are excellent all-purpose rubbers that are useful in a wide variety of applications, including the manufacture of hoses, seals and weather strips. Due in part to the substantial absence of unsaturation in the polymer backbone, EPDM rubbers exhibit superior oxidative and ozone resistance, weather resistance and heat resistance compared to conjugated diene rubbers. In addition, EPDM rubbers compare favorably in price to other elastomers and maintain their properties across a broad range of filler concentrations.

While these polymers provide acceptable performance and exhibit good processability, a tight EPDM supply coupled with an ever increasing market demand for EPDM rubbers drives the search for a low cost EPDM rubber blend that would compare favorably with unblended EPDM rubbers. Toward this end, EPDM has been blended with other elastomers in an effort to develop a rubber with comparable physical properties as unblended EPDM rubber that retains the oxygen, ozone and heat resistance of EPDM while maintaining or reducing the cost of the final composition. These elastomers have included conjugated diene rubbers and polychloroprene. The effectiveness of these compounds is limited by the fact that the weight percent of EPDM that may be added is fairly limited in order to produce a compound with acceptable mechanical properties. In addition, the processing of such compounds is often troublesome and expensive.

Styrene-butadiene rubber (SBR) is a diene rubber that is often considered a candidate for blending with EPDM. It is low in cost and relatively easy to process. Unfortunately, SBR, along with most other diene rubbers, are immiscible in EPDM and exhibit cure incompatibility with EPDM. This cure incompatibility of EPDM and highly unsaturated diene rubbers is demonstrated by the poor performance of the resulting composition in stress-strain tests. In addition, SBR does not tolerate high levels of carbon black and oil incorporation, showing a sharp decrease in its physical properties when even moderately high levels of filler are added. FIG. 1 shows the tensile strengths of EPDM/SBR blends at high carbon black and oil loadings as a function of the concentration of the individual elastomers.

As can be seen, the actual tensile strengths observed for these polymer blends are much lower than the calculated tensile strength of an ideal blend of the two polymers. In fact, such compositions generally perform worse than either pure polymer. This poor performance is due in part to several factors. One cause of this incompatibility is the difference in vulcanization rates. Optimal vulcanization parameters for one of the rubbers will lead to poor vulcanization of the other. This, combined with the preference of various accelerators for one polymer over the other, makes it difficult to achieve satisfactory vulcanization for both polymers. A second factor that contributes to poor vulcanization is the difficulty in achieving uniform dispersion among the two rubbers. Widely different solubility parameters produce poor compatibility between the two rubbers, resulting in difficulty when attempting to mix them to a uniform dispersion. This produces a non-uniform product with irregular properties. Traditional compatibilizers such as terpene resins and surface activated low molecular weight polymers have not been fully effective in mitigating this incompatibility.

A generally accepted industry standard for many rubber parts used in the automotive industry is that the compound must display a minimum tensile strength of 8.0 MPa. This value is now incorporated into the SAE J200 specification for loaded rubber compounds in the automotive industry. Unblended EPDM rubbers can achieve this value over a wide range of filler concentrations. Until now however, high oil and carbon black loaded blends of EPDM rubber blended with a high diene rubber have had difficulty achieving this value.

Therefore, a need remains for a blend of EPDM rubber and a high diene rubber which displays physical and dynamic mechanical properties comparable to unblended EPDM rubber while maintaining ease of processing, moderate cost and heat and oxidative resistance.

BRIEF SUMMARY OF THE INVENTION

The present invention provides a blend of an ethylene-$\alpha$-olefin-diene rubber and a high diene rubber that exhibits a tensile strength and other properties comparable to the calculated values for an ideal blend of the two polymers while maintaining the thermal and oxidative resistance of an EPDM rubber. The blends exhibit a tensile strength of greater than 8.0 MPa and a compression set after 22 hours at 70° C. of less than 20%.

The compounds of the present invention comprise an oil extended high molecular weight EPDM rubber, a diene rubber, and a low molecular weight EPDM rubber with a relatively broad molecular weight distribution, low Mooney viscosity and high ethylene content which serves as a compatibilizer. Also included in the composition are various cure agents and vulcanization accelerators. In addition, the blends may contain conventional additives standard in the industry.

The vulcanized rubbers of the present invention are obtained by processing the composition using conventional equipment and techniques and curing the rubber using conventional vulcanization systems and conditions.

DETAILED DESCRIPTION OF THE PREFERRED EMBODIMENTS

Figure 1:
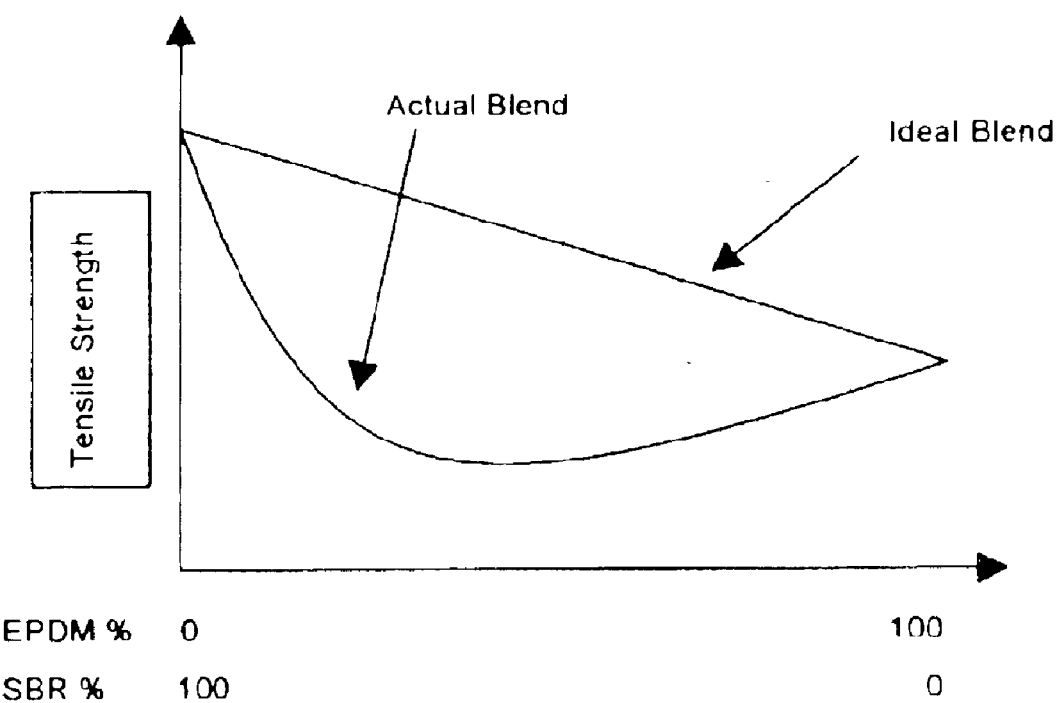
FIG. 1 is a graph of the tensile strengths of EPDM/SRR blends as a function of the concentration of the individual elastomers.

The compounds of the present invention comprise a high molecular weight EPDM rubber, a diene rubber, and a low molecular weight EPDM rubber with a broad molecular weight distribution, low Mooney viscosity and high ethylene content as a compatibilizer. Also included in the composition are various cure agents and vulcanization accelerators.

The high molecular weight EPDM rubber used in the present invention can be comprised of various monomers. While EPDM is used herein as an example and for convenience, it is contemplated that other ethylene-α-olefin-diene terpolymers may be utilized. Thus, in addition to propylene, suitable α-olefins for use in the present invention are designated by the formula $CH_2=CHR$, where R is a hydrogen or alkyl of 1 to 12 carbon atoms. Examples of suitable α-olefins include but are not limited to propylene, isobutylene, 1butene, 1-pentene and 1-octene. A preferred α-olefin is propylene. Likewise, the diene in the high molecular weight EPDM can be any of a number of compounds including but not limited to nonconjugated dienes such as 1,4-pentadiene, 5-ethylidene-2-norbornene, cyclopentadiene, cyclohexadiene, and 5-butylidene-2-norbornene as well as other straight chain, cyclic and bridged cyclic dienes. A preferred diene is 5-ethylidene-2-norbornene.

The high molecular weight EPDM rubber used in the present invention has an ethylene content ($C_2\%$) of from about 40% to about 80% by weight, a diene content of from about 1% to about 20% by weight and an α-olefin content of from about 20% to about 60% weight, based on the total weight of the polymer. Preferably, the high molecular weight EPDM rubber has an ethylene content of from about 50% to about 70% by weight, a diene content of from about 1% to about 10% by weight and an α-olefin content of 30% to about 50% by weight, based on the total weight of the polymer. The high molecular weight EPDM rubber may be oil extended or contain various additives such as carbon black. Most preferably, the high molecular weight EPDM rubber has an ethylene content of about 58% to about 68% by weight, an ethylidene norbornene content of about 8% to about 11.5% by weight, a Mooney viscosity (ML (1+8) at 150° C.) according to ASTM D1646 of about 20 to about 40, and an oil content of from about 45% to about 55% as measured according to ASTM D5774. A suitable high molecular weight EPDM for the present invention is BUNA® EPT 4969 manufactured by the Bayer Corporation.

The diene rubber of the present invention is a high diene hydrocarbon rubber which is a homopolymer made from a diolefin monomer or a copolymer comprising primarily diolefins. Examples of suitable diene rubbers for use in the present invention include, but are not limited to, natural rubber, synthetic polyisoprene, polybutadiene, and copolymers of isoprene or butadiene with other suitable monomers such as styrene. A preferred diene rubber is styrene butadiene rubber (SBR). For convenience, SBR will be used as an example herein, although other dienes are contemplated as stated above.

The styrene-butadiene rubber used in the present invention can be any commercial grade SBR available. Preferably, the SBR will have a bound styrene content of from about 15% by weight to about 35% by weight, more preferably about 20% by weight to about 25% by weight. A suitable SBR is SBR 1500 manufactured by Ameripol Synpol Corp.

The lower molecular weight EPDM rubber used in the present invention can be comprised of various monomers. While EPDM is used herein as an example and for convenience, it is contemplated that other ethylene-α-olefin-diene terpolymers may also be used. Thus, in addition to propylene, suitable α-olefins for use in the present invention are designated by the formula $CH_2=CHR$, where R is a hydrogen or alkyl of 1 to 12 carbon atoms. Examples of suitable α-olefins include but are not limited to propylene, isobutylene, 1-butene, 1-pentene and 1-octene. A preferred α-olefin is propylene. Likewise, the diene of the lower molecular weight EPDM can be any of a number of compounds including but not limited to nonconjugated dienes such as 1,4-pentadiene, 5-ethylidene-2-norbornene, cyclopentadiene, cyclohexadiene, and 5-butylidene-2-norbornene as well as other straight chain, cyclic and bridged cyclic dienes. A preferred diene is 5-ethylidene-2-norbornene.

The lower molecular weight EPDM rubbers used in the present invention have an ethylene content ($C_2\%$) of from about 50% to about 90% by weight, a diene content of from about 1% to about 20% by weight and an α-olefin content of from about 10% to about 50% weight, based on the total weight of the polymer. Preferably, the lower molecular weight EPDM rubber has an ethylene content of from about 55% to about 85% by weight, a diene content of from about 1% to about 10% by weight and an α-olefin content of 20% to about 50% by weight, based on the total weight of the polymer. Most preferably, the lower molecular weight EPDM rubber has an ethylene content of about 75% to about 85% by weight, a ethylidene norbornene content of about 5% to about 10% by weight, a Mooney viscosity (ML (1+4) at 125° C.) of from about 13 to about 27, and a bimodal molecular weight distribution. As used herein, "bimodal" refers to a state in which the distribution of molecular weights of individual chains in the polymer shows a large concentration at two distinct molecular weights. This generally results in a broader molecular weight distribution than a polymer exhibiting a comparable unimodal distribution. A suitable lower molecular weight EPDM for use in the present invention is Vistalon® 7800 manufactured by ExxonMobil Corporation.

The blend preferably contains about 80 parts per hundred resin (phr) to about 120 phr of an oil extended high molecular weight EPDM, about 10 phr to about 40 phr of a styrene-butadiene rubber, and about 20 phr to about 45 phr of a lower molecular weight EPDM. In addition, the blend may contain about 120 to about 200 phr carbon black, about 70 to about 120 phr processing oil and about 40 to about 80 phr whitening agent (such as $CaCo_3$ and/or zinc oxide). Most preferably, the blend contains about 90 phr of an oil extended high molecular weight EPDM, about 35 phr of a styrene-butadiene rubber, about 35 phr of a lower molecular weight EPDM, about 160 phr carbon black and about 80 phr paraffinic oil.

More than one high molecular weight EPDM rubber can be used in the blend. Likewise, more than one styrene-butadiene rubber and more than one lower molecular weight EPDM rubber can be employed. In such a case, the similar polymers are treated as one compound for purposes of determining the concentration ratio of the various components in the blend.

The polymer blend is preferably cured using sulfur and/or a sulfur donor and one or more cure accelerators. However, other cure systems are also contemplated by the invention. Examples of suitable sulfur donors and accelerators include, but are not limited to, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), and N-t-butylbenzothiazole-2-sulfanamide (TBBS).

Preferably, the sulfur and/or sulfur donor is used in a range from about 1 phr to about 5 phr. The accelerator(s) are preferably used in a range from about 1 phr to about 5 phr.

Most preferably, a cure system comprising a combination of sulfur/TMTD/DPTT/ZDBC/MBTS/TBBS in a phr concentration ratio of about 1.7/0.5/1.0/0.2/2.0/1.5 is used.

In addition to the rubbers and the cure system components, the blends produced according to the invention may contain various other ingredients in amounts that do not detract from the properties of the resultant blends. These ingredients include, but are not limited to: activators such as zinc oxide and other metal oxides; fatty acids such as stearic acid and salts thereof; fillers and reinforcers such as carbon black, calcium or magnesium carbonate, silica, aluminum silicates, and the like; plasticizers and extenders such as dialkyl organic acids, naphthalenic and paraffinic oils and the like; antidegradants; softeners; waxes; and pigments.

The polymer blend, along with the various curatives, accelerators and other components, is mixed using conventional equipment and techniques for a temperature and time necessary to obtain a uniform mixing. The blends may be accelerated on a mill and cured under typical vulcanization temperatures and time conditions. A preferable cure cycle is for 20 minutes at 160° C.

EXAMPLES

The following examples illustrate the present invention more specifically. Ingredient concentrations are given in parts per hundred resin (phr) unless otherwise specified. A suitable styrene-butadiene rubber, tradename SBR 1500, manufactured by the Ameripol Synpol Corporation, Akron, Ohio, was used as the styrene-butadiene rubber in all trials. It has a styrene content of about 23% by weight and a Mooney viscosity, ML (1+4) at 100° C., of about 46 to about 58. The properties of the various grades of EPDM rubber used in the examples are listed in table 1. The polymers, accelerator system and compounding agents were mixed in a Banbury mixer consistent with standard mixing techniques. The blend was then accelerated on a mill and heated at 160° C. for 20 minutes to prepare a vulcanizate. Physical testing was performed on the vulcanized samples. To be useful as EPDM substitutes, the resulting vulcanizates must exhibit a tensile strength of greater than 8.0 MPa according to ASTM D412. Thus, any blends that did not produce vulcanizates having this minimum value are not included in the following data table. Ideally, the vulcanizates also exhibit a compression set of less than 20%.

Example 1

In the first testing trials, the properties of an EPDM/SBR blend without the use of a compatibilizer and the properties of an unblended EPDM rubber were compared. First, the physicals of a vulcanizate made from Buna® EPG 6850, a low molecular weight EPDM rubber manufactured by the Bayer Corp. were tested. As a cure system, "system 1" was used consisting of:

| | |
|---|---|
| S-80 | 1 phr |
| TMTD-67 | 0.6 phr |
| DPTT-67 | 1.2 phr |
| ZDBC-67 | 0.27 phr |
| MBTS-67 | 0.6 phr |
| TBBS-67 | 1.5 phr |

The exact composition of the vulcanizate and the average values for their physical test data is noted in table 2 under the heading "Sample 5". Use of an alternate cure system produced a slightly higher tensile strength but unacceptably large compression set as noted in table 2, under the heading "Sample 1". Next, 20 phr and 40 phr of the Buna® EPG 6850 EPDM rubber was replaced with SBR while using cure system 1 and keeping the other components constant. The tensile strength of the resulting vulcanizates dropped from an average of 8.3 MPa for the EPDM samples to 3.5 MPa for the EPDM/SBR blended samples while the compression set increased from 12% to 30%. No improvement in the blend was observed when the amount of carbon black was reduced or when the accelerator system was varied.

Example 2

These trials investigated the use of a higher molecular weight EPDM/SBR blend without a compatibilizer. First, the physicals of a vulcanizate made from Buna® EPT 9650, a non-oil extended high molecular weight EPDM manufactured by Bayer Corp., were tested. As a cure system, "system 2" was used consisting of:

TABLE 1

| EPDM | Supplier | Ethylene Content (C2% by weight) | ENB Content (% by weight) | Oil | Mooney Viscosity |
|---|---|---|---|---|---|
| Buna EPG 6850 | Bayer | 51 ± 4 | 7.1 ± 1.1 | — | 60 ± 5 ML (1 + 4) 125° C. |
| Buna EPT 4969 | Bayer | 62 ± 4 | 9.8 ± 1.4 | 50% ± 3% | 30 ± 7 ML (1 + 8) 150° C. |
| Buna EPT 9650 | Bayer | 53 ± 4 | 6.5 ± 1.1 | — | 60 ± 6 ML (1 + 8) 150° C. |
| Keltan 509 × 100 | DSM Elastomers | 64 | 8 | 50% | 47 ML (1 + 4) 125° C. |
| Mega 7265 | Union Carbide | 68 | 4 | 20 phr carbon black | 75 ML (1 + 4) 125° C. |
| Vistalon 6505 | ExxonMobil | 57 | 9.2 | — | 53 ML (1 + 4) 125° C. |
| Vistalon 7000 | ExxonMobil | 73 | 5 | — | 59 ML (1 + 4) 125° C. |
| Vistalon 7800 | ExxonMobil | 79 | 6 | — | 20 ML (1 + 4) 125° C. |

|          |          |
| -------- | -------- |
| S-80     | 1.5 phr  |
| TMTD-67  | 0.6 phr  |
| DPTT-67  | 1.2 phr  |
| ZDBC-67  | 0.27 phr |
| MBTS-67  | 0.6 phr  |
| TBBS-67  | 1.5 phr  |

The exact composition of the vulcanizates and the average values for their physical test data is noted in table 2 under the heading "Sample 3". Next, 20 phr and 40 phr of the Buna® EPT 9650 EPDM rubber was replaced with SBR while keeping the other components constant. The tensile strength of the resulting vulcanizates dropped from 8.8 MPa for the EPDM samples to between 4.0 and 5.0 MPa for the EPDM/SBR blended samples. Replacing 20 phr resin of the Carbon Black N550 with Carbon Black N330 increased the tensile strength of the blend to a maximum of 5.7 MPa. Replacement of a portion of the Flexon 815 aliphatic oil with a naphthenic oil leads to a drop in tensile strength down to about 3.0 MPa. Using a blend of Buna® EPT 9650 and Buna® EPG 6850 in this EPDM/SBR blend increases the tensile up to about 6.0 MPa. This result suggested that using a blend of high molecular weight EPDM and a low molecular weight EPDM in an EPDM/SBR blend would be advantageous.

Example 3

Following this suggestion, an EPDM/SBR blend containing both a high molecular weight EPDM and a low molecular weight EPDM was investigated. Keltan 509×100, a very high molecular weight EPDM manufactured by DSM elastomers, was used in a blend with Vistalon 6505, a lower molecular weight EPDM with a broad molecular weight distribution manufactured by the ExxonMobil Corp. All compounds contained 30 phr SBR. Various cure systems were tested, including "system 1" and "system 2" detailed above, and "system 3" consisting of:

|           |         |
| --------- | ------- |
| Sulphur-80 | 1.8 phr |
| MBTS-67   | 1 phr   |
| TBBS-67   | 2.5 phr |

The tensile strength of the resulting composites were between 7.4 and 7.8 MPa. Tensile values were generally higher if the cure was slow (t90 from about 3–5 minutes at 177° C.). A tensile strength of 7.7 MPa was achieved with a fast cure time (t90 of 1.9 minutes at 177° C.) using Vistalon 7000 instead of Vistalon 6505. Vistalon 7000 has a significantly higher ethylene content than Vistalon 6505 (see table 1). This result suggests that a higher ethylene content of the low molecular weight EPDM compatibilizer will increase the tensile strength of the resulting vulcanizates.

Example 4

To investigate the effect of ethylene content of the low molecular weight EPDM being used as a compatibilizer, different EPDM's containing varied ethylene content were used in manufacturing EPDM/SBR blended extrudates. In these trials, Mega® 7265, a non-oil extended high molecular weight EPDM containing 20 phr N550 Carbon Black and manufactured by Union Carbide, was used. The various curing systems mentioned above were used. In all compounds, the tensile strength of the resulting vulcanizates was below 5 MPa when Vistalon 6505 was used as a compatibilizer. Subsequent samples using Vistalon 7800 displayed tensile strengths of close to 6 MPa. Vistalon 7800 has a lower molecular weight and a higher ethylene content than Vistalon 6505.

Example 5

The use of an extremely high molecular weight, oil-extended EPDM with a low molecular weight, high ethylene content EPDM as a compatibilizer was investigated. Buna EPT 4969 was used as the high molecular weight EPDM and Vistalon 7800 was used as the compatibilizer. The optimization of curing system and carbon black concentration was determined. First, samples containing various concentrations of Buna EPT 4969, Vistalon 7800, SBR as well as various cure systems were measured. Most samples exhibited a tensile strength of between 6.9 and 8.1 MPa. Fixing the amount of Buna EPT 4969 at 90 phr, Vistalon 7800 at 35 phr and SBR at 20 phr produced samples that exhibited tensile strengths of from 8.1 to 8.6 with vulcanization times of about 2.5 minutes or less at 177° C. The concentration of Carbon Black N550 was optimized at 160 phr. Although slightly greater tensile strengths were achieved using different cure systems that produced longer scorch times (see Samples 4, 7–8, and 10–11 in table 2), the cure system producing the best combination of physical properties and acceptable cure time in the vulcanizates was "system 4" comprising:

|           |         |
| --------- | ------- |
| Sulphur-80 | 1.7 phr |
| TMTD-67   | 0.5 phr |
| DPTT-67   | 1.0 phr |
| ZDBC-67   | 0.2 phr |
| MBTS-67   | 2.0 phr |
| TBBS-67   | 1.5 phr |

Results are shown in table 2 under example 6. This sample produced a tensile strength of 8.3 and a compression set of 19.8% with a vulcanization time of 2.54 minutes (t90 at 177° C.). Samples exposed to ozone did not show any discoloration. An identical vulcanizate using Keltan 509×100 instead of Buna EPT 4969 yielded samples having a tensile strength of less than 7.0 MPa.

TABLE 2

| | Sample No. | | | | | | | | | | |
| --- | --- | --- | --- | --- | --- | --- | --- | --- | --- | --- | --- |
| | 1 | 2 | 3 | 4 | 5 | 6 | 7 | 8 | 9 | 10 | 11 |
| Buna EP G 6850 | 100 | | | | 100 | | | | | | |
| Buna EP T 9650 | | 100 | 100 | | | | | | 100 | | |
| Buna EP T 4949 | | | | 90 | | 90 | 90 | 80 | | 80 | 90 |

TABLE 2-continued

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |
| Vistalon 7800 | | | | 35 | | 35 | 35 | 30 | | 30 | 35 |
| SBR 1500 | | | | 20 | | 20 | 20 | 30 | | 30 | 20 |
| Statex C.B. 330[1] | | 20 | | | | | | | | | |
| 6630 Black[2] | 176 | 156 | 176 | 160 | 176 | 160 | 170 | 160 | 150 | 160 | 165 |
| N 660 Black[3] | | | | | | | | | 40 | | |
| Snowhite 3[4] | 48 | 48 | 48 | 50 | 48 | 50 | 50 | 50 | 60 | 50 | 50 |
| Zinc Oxide CR-4[5] | 5 | 4.7 | 4.5 | 5 | 5 | 5 | 5 | 5 | 4.5 | 5 | 5 |
| Pristerene 9429[6] | 1.5 | 1.5 | 1.5 | 1 | 1.5 | 1 | 1 | 1 | 1.5 | 1 | 1 |
| Pluriol E4000[7] | 1.5 | 1.5 | 1 | | 1.5 | | | | 1 | | |
| Rhenosorb CG/W[8] | 5.5 | 4 | 4.1 | 2 | 5.5 | 2 | 2 | 2 | 4.1 | 2 | 2 |
| Aflux 42[9] | 2 | | | | 2 | | | | | | |
| Flectol Pastilles[10] | | | | 2 | | 2 | 2 | 2 | | 2 | 2 |
| Struktol A50[11] | | 2 | 2 | | | | | | 2 | | |
| Cumar Resin R16A[12] | | 3 | 2 | | | | | | 2 | | |
| Shenectady 1066[13] | | | | | | | | | | | |
| XUR 1252-01330-23[14] | | | 3 | | | | | | 3 | | |
| Naphtenic Oil[15] | | | | | 106 | | | | | | |
| Flexon 815[16] | 106 | 130 | 131 | 80 | | 80 | 70 | 80 | 131 | 80 | 75 |
| TOTAL MASTERBATCH | 445.5 | 470.7 | 473.1 | 445 | 445.5 | 445 | 445 | 440 | 499.1 | 440 | 445 |
| Sulfur-80[17] | 2.13 | 1.3 | 1.5 | 2.2 | 1 | 1.7 | 1.7 | 2.2 | 1.5 | 1.7 | 1.7 |
| TMTD-67[18] | 0.61 | | 0.6 | | 0.61 | 0.5 | 0.5 | | 0.6 | 0.5 | 0.5 |
| DPTT-57[19] | 0.9 | 1.3 | 1.2 | | 1.2 | 1 | 1 | | 1.2 | 1 | 1 |
| ZDBC-70[20] | 0.27 | | 0.27 | | 0.27 | | | | 0.27 | | |
| ZDEC-67[21] | | | | 0.5 | | 0.2 | 0.2 | 0.5 | | 0.2 | 0.2 |
| MBT-67[22] | 1.19 | | | | | | | | | | |
| MBTS-67[23] | | 1.7 | 0.6 | 2 | 0.6 | 2 | 2 | 2 | 0.6 | 2 | 2 |
| TBBS-67[24] | | 1 | 1.5 | 1.5 | 1.5 | 1.5 | 1.5 | 1.5 | 1.5 | 1.5 | 1.5 |
| Rhenocure ZDT/G[25] | | 2 | | | | | | | | | |
| TOTAL CURATIVES | 5.1 | 7.3 | 5.67 | 6.2 | 5.18 | 6.9 | 6.9 | 6.5 | 5.67 | 6.9 | 6.9 |
| MOONEY[26] | 49.3 | 47.9 | 45.5 | 37.9 | 44.1 | 38.8 | 49 | 36.8 | 48.8 | 45.9 | 42.5 |
| T5[27] | 7.16 | 11.12 | 15.64 | 29.22 | 16.07 | 18.36 | 22.54 | 19.9 | 13.8 | 18.57 | 18.72 |
| MDR MIN[28] | 1.6 | 1.48 | 1.34 | 1.58 | 1.54 | 1.7 | 2.96 | 1.72 | 1.53 | 2.38 | 1.87 |
| MDR MAX[29] | 11.27 | 9.68 | 9.57 | 8.38 | 12.33 | 8.53 | 10.73 | 8.29 | 10.18 | 9.97 | 8.55 |
| Delta Mmax-Mmin[30] | 9.67 | 8.2 | 8.23 | 6.8 | 10.79 | 6.83 | 7.77 | 6.57 | 5.65 | 7.59 | 6.68 |
| TS2[31] | 0.64 | 1.12 | 1.27 | 1.53 | 1.27 | 1.21 | 1.03 | 1.48 | 1.24 | 0.95 | 1.14 |
| T10[32] | | | | 1.06 | | 0.82 | 0.72 | 1.01 | | 0.66 | 0.78 |
| T50[33] | 0.88 | 1.44 | 1.63 | 1.86 | 1.56 | 1.46 | 1.3 | 1.79 | 1.61 | 1.23 | 1.35 |
| T90[34] | 1.97 | 2.96 | 2.93 | 3.65 | 2.11 | 2.54 | 2.18 | 3.44 | 3.04 | 1.92 | 2.25 |
| Tensile[35] | 9.7 | 9.3 | 8.8 | 8.6 | 8.3 | 8.3 | 8.2 | 8.1 | 8 | 8 | 8 |
| Elongation[36] | 397 | 425 | 500 | 376 | 297 | 363 | 28. | 332 | 436 | 229 | 346 |
| Hardness[37] | 73 | 71 | 69 | 75 | 75 | 75 | 80 | 75 | 71 | 80 | 80 |
| C. Set 22 h@70C[38] | 33 | 15 | 12 | 20.7 | 12 | 19.8 | 20.2 | 22 | 14 | 19.8 | 21.8 |
| C. Set 70 h@100C[39] | | 30 | | | | | | | | | |
| Tensile Change 70 h@70C[40] | | 0 | 3.5 | | | | | | 1 | | |
| Elongation Change[41] | | 3 | −6 | | | | | | 0.5 | | |
| Hardness Change[42] | | 0 | −2 | | | | | | −1 | | |

[1] Carbon Black manufactured by Columbian
[2] Carbon Black manufactured by Cabot
[3] Carbon Black manufactured by Columbian
[4] CaCO3 manufactured by Lomas
[5] Zinc Oxide manufactured by GHCHEM
[6] Stearic Acid manufactured by Lomas
[7] Polyethylene glycol
[8] Calcium oxide
[9] Ester wax
[10] Polymerized 1,2-dihyro-2,2,4 trimethylquinoline
[11] Zinc stearate
[12] Cumar Inden resin
[13] Phenolic resin
[14] ES diblock copolymer - 40% styrene manufactured by Dow Chemical
[15] Essoflex 470 naphthenic oil manufactured by Imperial Oil
[16] Parrafinic oil manufactured by Imperial Oil

TABLE 2-continued

| | Sample No. | | | | | | | | | | |
|---|---|---|---|---|---|---|---|---|---|---|---|
| | 1 | 2 | 3 | 4 | 5 | 6 | 7 | 8 | 9 | 10 | 11 |

[17]Manufactured by Hartwick
[18]tetramethylthiuram disulfide
[19]dipentamethylenethiuram tetrasulfide
[20]zinc dibutyldithiocarbamate
[21]zinc diethyldithiocarbamatezinc
[22]2-mercaptobenzothiazolate
[23]2-mercaptobenzothiazolate disulfide
[24]N-t-butylbenzothiazole-2-sulfanamide
[25]Calcium oxide
[26]Tested according to ASTM D1646 (Mooney units)
[27]Tested according to ASTM D1646 (minutes)
[28]Oscillating disc torque minimum (lbs/inch)
[29]Oscillating disc torque maximum (lbs/inch)
[30]Difference between minimum and maximum torque (lbs/inch)
[31]2 point rise from minimum torque measured according to ASTM D2084 (minutes)
[32]10% rise from minimum torque measured according to ASTM D2084 (minutes)
[33]50% rise from minimum torque measured according to ASTM D2084 (minutes)
[34]90% rise from minimum torque measured according to ASTM D2084 (minutes)
[35]Tensile strength measured according to ASTM D412 (MPa)
[36]% elongation at break measured according to ASTM D412
[37]Shore A hardness measured according to ASTM D2240
[38]Compression set after 22 hrs at 70° C. measured according to ASTM D395 (%)
[39]Compression set after 70 hrs at 100° C. measured according to ASTM D395 (%)
[40]Change of tensile strength after aging for 70 hrs at 70° C. (MPa)
[41]Change of elongation after aging for 70 hrs at 70° C. (%)
[42]Change of hardness after aging for 70 hrs at 70° C. (Shore A)

The invention has been described with reference to various preferred embodiments. Modifications and alterations will occur to others upon a reading and understanding of the specification. The invention is intended to include all such modifications and alterations insofar as they come within the scope of the appended claims and the equivalents thereof.

What is claimed is:

1. A polymer blend adapted to replace unblended EPDM, said polymer blend comprising:
   a first EPDM rubber having a Mooney viscosity (ML (1+8) at 150° C.) of from about 20 to about 40;
   a conjugated diene rubber; and
   a second EPDM rubber having a Mooney viscosity (ML (1+4) at 125° C.) or from about 13 to about 27.

2. The polymer blend of claim 1, wherein said conjugated diene rubber is a styrene-butadiene rubber.

3. The polymer blend of claim 2, wherein said styrene-butadiene rubber has a styrene content of about 15% to about 35% by weight.

4. The polymer blend of claim 1, wherein said polymer blend comprises about 60 phr to about 120 phr of said first EPDM rubber, about 10 phr to about 40 phr of said conjugated diene rubber and about 25 phr to about 45 phr of said second EPDM rubber.

5. The polymer blend of claim 1, wherein said first EPDM rubber is an oil-extended EPDM rubber.

6. The polymer blend of claim 5, wherein said first EPDM rubber has an ethylene content of about 58% to about 68% by weight of EPDM, a diene content of about 8.0% to about 11.5% by weight of EPDM and an oil content of about 45% to about 55% by total weight of the rubber.

7. The polymer blend of claim 1, wherein said second EPDM rubber has an ethylene content of about 75% to about 85% by weight a diene content of about 5% to about 10% by weight and a bimodal molecular weight distribution.

8. The polymer blend of claim 6, wherein oil comprises from about 40% to about 60% by weight of the oil-extended EPDM.

9. The polymer blend of claim 1, further comprising about 120 phr to about 200 phr of a carbon black.

10. The polymer blend of claim 9, further comprising about 70 phr to about 120 phr of a paraffinic or naphthenic oil.

11. The polymer blend of claim 1, wherein said polymer blend possesses cure properties such that it exhibits a vulcanization time (t90) of about 2.2 minutes or less when exposed to a temperature of 1770° C.

12. The polymer blend of claim 1, wherein said polymer blend possesses a tensile strength of greater than 8.0 MPa and a compression set less than about 20% after vulcanization.

13. The polymer blend of claim 1, wherein said blend further comprises a cure system comprising at least one compound selected from the group consisting of sulfur and a sulfur donor in a concentration of about 1 phr to about 5 phr end at least one vulcanization accelerator in a concentration of about 1 to about 5 phr.

14. The polymer blend according to claim 13, wherein said cure system comprises a combination of sulfur/tetramethylthiuram disulfide/dipentamethylenethiuram tetrasulfide/zinc dibutyldithiocarbamate/2-mercaptobenzothiazolate disulfide/N-t-butylbenzothiazole-2-sulfanimide in a phr concentration of about 1.7/0.5/1.0/0.2/2.0/1.5.

15. A polymer blend comprising:
   an oil extended first EPDM rubber having a Mooney viscosity (ML (1+8) at 150° C.) of from about 20 to about 40, an ethylene content of about 58% to about 68% by weight of EPDM, a diene content of about 8.0% to about 11.5% by weight of EPDM and an oil content of about 45% to about 55% by total weight of said rubber;
   a styrene-butadiene rubber;
   a second EPDM rubber having a Mooney viscosity (ML (1+4) at 125° C.) of from about 13 to about 27, an ethylene content of about 75% to about 85% by weight, a diene content of about 5% to about 10% by weight and a bimodal molecular weight distribution;
   about 120 to about 200 phr carbon black;

about 70 to about 100 phr oil; and a cure system comprising a combination of sulfur/ tetramethylthiuram disulfide/dipentamethylenethiuram tetrasulfide/zinc dibutyldithiocarbamate/2-mercaptobenzothiazolate disulfide/N-butylbenzothiazole-2-sulfanimide in a phr concentration of about 1.7/0.5/1.0/0.2/2.0/1.5.

16. A polymer blend according to claim 15, wherein said blend contains about 90 phr of said oil extended first EPDM, about 35 phr of said styrene-butadiene rubber, about 35 phr or said second EPDM, about 160 phr of said carbon black and about 50 phr of said oil.

* * * * *